United States Patent [19]

Nakatsuka

[11] Patent Number: 4,637,009

[45] Date of Patent: Jan. 13, 1987

[54] GROUNDING CIRCUIT FOR PICKUP CARTRIDGE MOVING COIL

[75] Inventor: Hisayoshi Nakatsuka, Mitaka, Japan

[73] Assignee: Namiki Precision Jewel Co., Ltd., Tokyo, Japan

[21] Appl. No.: 645,775

[22] Filed: Aug. 30, 1984

[30] Foreign Application Priority Data

Apr. 27, 1983 [JP] Japan ............................ 59-62392[U]

[51] Int. Cl.[4] .......................... H04R 9/12; G11B 3/46

[52] U.S. Cl. ...................................................... 369/147

[58] Field of Search ............... 369/135, 136, 138, 146, 369/147, 148, 256

[56] References Cited

U.S. PATENT DOCUMENTS 3,963,880 6/1976 Ikeda .................................. 369/147
4,138,122 2/1979 Nakatsuka ........................... 369/147
4,237,349 12/1980 Hansen et al. ...................... 369/147
4,376,304 3/1983 Uchida et al. ...................... 369/147

FOREIGN PATENT DOCUMENTS 56-68100 8/1981 Japan .................................. 369/147

*Primary Examiner*—Donald McElheny, Jr.
*Attorney, Agent, or Firm*—Gerald J. Ferguson, Jr; Michael P. Hoffman; Ronni S. Malamud

[57] ABSTRACT

A pickup cartridge of the moving coil type including a magnetic circuit having, in series, (a) an armature with which the coil is associated, (b) a rear yoke, (c) a magnet, and (d) a front yoke. The improvement constitutes grounding magnetic circuit at a point substantially removed from the armature in the series magnetic circuit, the grounding point being at least as far removed from the armature as the surface of the front yoke. Preferably the grounding point is on the end of the front yoke farthest from the armature.

2 Claims, 3 Drawing Figures

GROUNDING CIRCUIT FOR PICKUP CARTRIDGE MOVING COIL

BACKGROUND OF THE INVENTION

1. Field of the Invention

This invention relates to a moving coil pickup cartridge and, in particular, to the grounding of the magnetic circuit for such a cartridge.

2. Discussion of the Prior Art

As shown in FIG. 1., a moving coil type pickup cartridge may include an armature 3 having a generator coil 2 wound thereabout. The rear of a cantilever 1 is joined at the center of the armature, the cantilever having a stylus tip at its front end. A ring-shaped damper 5 is placed between armature 3 and a pole piece 4 and the unit is held in place by a stopper 6 formed within the cantilever, a stopper 6' inserted and fixed in pole piece 4, and suspension wire 7. The magnetic circuit for the cartridge is comprised of a magnet 8, a rear yoke 9, pole piece 4, armature 3, and front yoke 10. Output voltage is induced in generator coil 2 by rotation of armature 3 during record reproduction, the coil output being applied to output terminals 11 comprising hot terminal H and ground terminal G. Since the space between the generator coil and armature is, in essence, insulated, the metal parts of the main structure including armature 3 must be electrostatically equipotential with generator coil 2 in order to eliminate capacitance and inductance generated in space. Consequently, measures have been taken to ground the magnetic circuit by connecting the ground line G of output terminals 11 to the rear end of pole piece 4 or rear yoke 9 as shown in FIG. 1. These measures have been taken to improve the reproduced sound quality response and the high frequency range.

SUMMARY OF THE INVENTION

As a result of research regarding various connecting positions for the ground line, it has been discovered, in accordance with the present invention, that grounding the magnetic circuit at a position substantially removed from the armature 3 contributes most to improved sound quality. Preferably the grounding should occur on the surface of front yoke 10 and, most preferably, at the end of the front yoke which is farthest removed from the armature.

Other objects and advantages of this invention will be apparent from a reading of the following specification and claims taken with the drawing.

DETAILED DESCRIPTION OF PREFERRED EMBODIMENTS OF THE INVENTION

Figure 1:
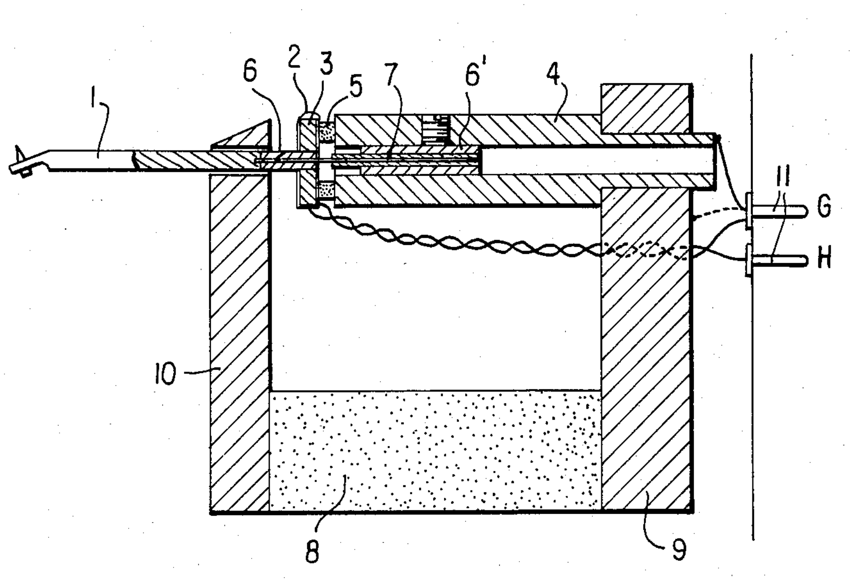
FIG. 1 (PRIOR ART)
FIG. 1 is a diagrammatic illustration in cross-section of a conventional pickup cartridge of the moving coil type in accordance with the prior art.

Reference should be made to the drawing where like reference numerals refer to like parts.

Figure 2:
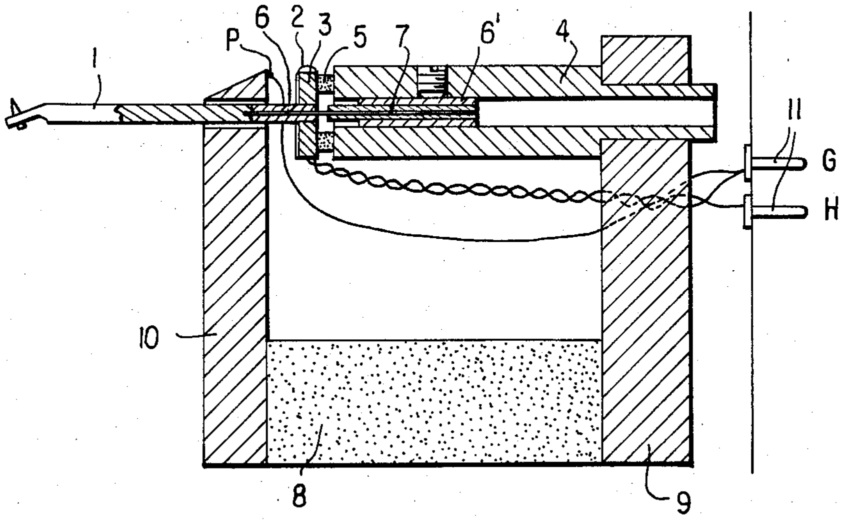
FIG. 2 is a diagrammatic illustration in cross-section of a pickup cartridge of a preferred embodiment in accordance with the invention.
Figure 3:
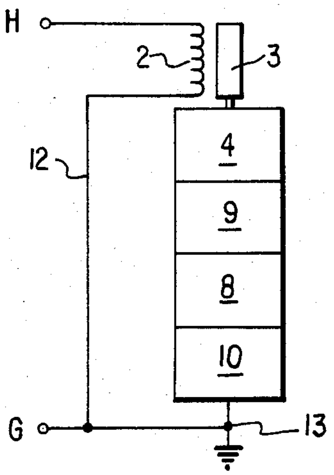
FIG. 3 is a schematic diagram for explaining the invention.

As shown in FIG. 2, ground terminal G of output terminals 11 is connected to front yoke 10, which is the component of the magnetic farthest from the armature in the sequence of armature 3, pole piece 4, rear yoke 9, and magnetic 8. This is further illustrated in FIG. 3. The magnetic circuit comprises in series connection, armature 3, pole piece 4, rear yoke 9, magnet 8, and front yoke 10. Generator coil 2 is positioned in parallel with armature 3 and an electrostatic potential response having a unidirectionality becomes possible by grounding earth line 12 to the terminal component 13 of the series arranged elements 3, 4, 9, 8, and 10 in the magnetic circuit. In fact, it is most preferable to establish the ground at the remote end P of the front yoke, which is positioned at the point farthest from the armature in the magnetic circuit, as shown in FIG. 2. In general, the ground point of the magnetic circuit should be substantially removed from the armature and may be on the surface of front yoke 10 but, again, as stated above, should preferably be at point P. The sound quality reproduced by the pickup cartridge of the present invention displays improved characteristics in the high frequency range, improved clarity in the mid-range, and improved responses in the low range. Other improvements such as reduced play-back distortion were obtained.

It is to be understood that the above detailed description of the various embodiments of the invention is provided by way of example only. Various details of design and construction may be modified without departing from the true spirit and scope of the invention as set forth in the appended claims.

What is claimed is:

1. In a pickup cartridge of the moving coil type including a non-symmetrical magnetic circuit having, in series, (a) an armature with which the coil is associated, (b) a pole piece, (c) a rear yoke for supporting said pole piece, (d) a magnet, and (e) a front yoke where a gap is disposed between the pole piece and the front yoke to effect said non-symmetrical magnetic circuit and where the armature is disposed in the gap, the improvement of grounding said magnetic circuit at a ground substantially removed from the armature in said series magnetic circuit, said grounding point being at least as far removed from the armature as the surface of the front yoke where the position of said ground point with respect to said armature is determined in the direction extending from the armature through the pole piece, rear yoke, the magnet, and the front yoke in the foregoing order and then back to the armature.

2. The improvement as in claim 1 where said grounding point is at the point on the front yoke farthest removed from the armature.

* * * * *